Nov. 26, 1968  J. J. NASH  3,412,640
ROCKET LAUNCHER

Filed May 19, 1967  2 Sheets—Sheet 1

Inventor
JOHN J. NASH
By John D. Joffe III
Attorney

Nov. 26, 1968   J. J. NASH   3,412,640
ROCKET LAUNCHER

Filed May 19, 1967   2 Sheets-Sheet 2

Inventor
JOHN J. NASH
By John D. Pope
Attorney ated Nov. 26, 1968

United States Patent Office 3,412,640
Patented Nov. 26, 1968

3,412,640
ROCKET LAUNCHER
John J. Nash, Ferguson, Mo., assignor to Alsco, Inc., St. Louis, Mo., a corporation of Delaware
Filed May 19, 1967, Ser. No. 639,735
10 Claims. (Cl. 89—1.806)

ABSTRACT OF THE DISCLOSURE

A rocket launcher having a plurality of clustered launcher tubes which are adapted to receive rockets. Each rocket is provided at its rear end with a latching rim having a peripheral groove and spring-loaded stabilizing fins mounted thereon. The fins spring outwardly once the rocket is completely free of the tube. Each rocket tube is fitted at its rear end with a spring detent which is adapted to fit into the groove in the latching rim and thereby retentively engage the rocket. The spring detent includes a blade which projects inwardly beyond one of the nozzles of the rocket so that when the rocket ignites the blast issuing from the nozzle will impinge against the blade and force the spring detent out of engagement with the latching rim, thereby freeing the rocket for forward movement. Each tube is also provided with a hook-like somewhat resilient tail contact located to the rear of the spring detent. In order to avoid permanent distortion of the spring detent and tail contact resulting from careless loading procedures, each tube is fitted with a stop member for halting rearward movement of the rocket immediately after it has engaged the spring detent. The stop member further engages the rocket fins and cams the rockets into the correct angular positions within the tubes.

---

This invention relates to rocket launchers, and more particularly to a rocket launcher which will not be damaged or rendered inoperative when rockets are thrust into the launcher tubes with excessive force.

Airborne rocket launchers of current manufacture generally possess a plurality of clustered launcher tubes, which are adapted to receive and hold rockets at their rear ends. These tubes are provided with latching devices and tail contacts, the former being adapted to retentively engage a rocket, while the latter are designed to establish electrical contact with rearwardly presented contactor buttons on the rockets. Such launchers are loaded by manually inserting rockets into the forward ends of the tubes and then urging them rearwardly into gentle engagement with the latching devices and tail contacts. Ordnance personnel have on occasion, in their desire to load such launchers as rapidly as possible, thrust the rockets too hastily through the tubes and have consequently rammed them into the latching devices and tail contacts. If the impact is hard enough, the latching devices and tail contacts will be permanently bent or otherwise damaged, and this could result in a misfire or a rocket being dislodged prior to firing.

Among the several objects of the present invention may be noted the provision of a rocket launcher which will not be damaged or rendered inoperative when rockets are manually thrust into the rocket tubes with excessive force; the provision of a stop for a rocket launcher tube which prevents the rockets from damaging the latching devices and tail contacts of the tube when rockets are thrust with excessive force into them; the provision of a stop which guides rockets into the correct angular position within the tubes; and the provision of a launcher tube which is simple and durable in construction and easy to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated:

Corresponding reference characters indicate corresponding parts throughout the several views of the drawings.

Figure 1:
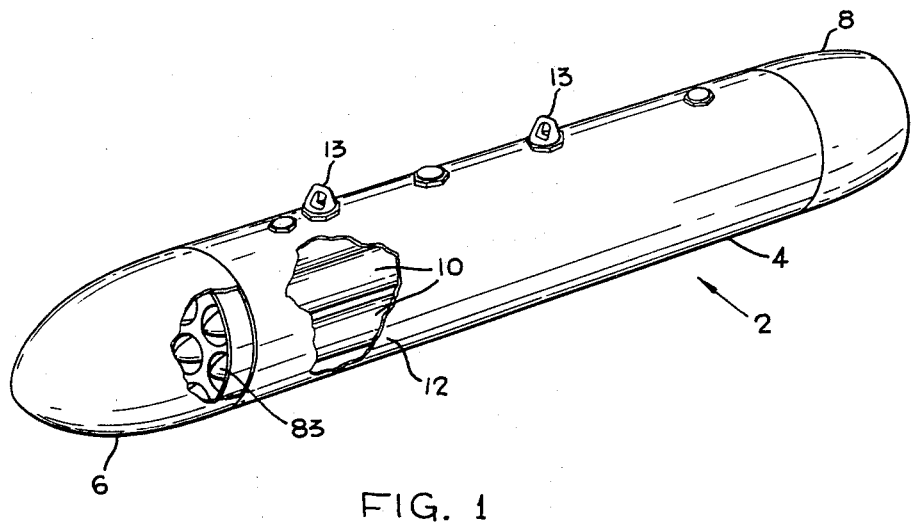
FIG. 1 is a perspective view, partially broken away, of a rocket launcher having launcher tubes constructed in accordance with and embodying the present invention.

Referring now to the drawings, 2 designates a rocket launcher including a launcher body 4, a nose fairing 6, and a tail fairing 8. Launcher body 4 is provided with a plurality of rocket tubes 10 which are surrounded by a cylindrical outer skin 12. Projecting outwardly beyond skin 12 are suspension lugs 13 which are adapted for retentive engagement by mating fittings on the aircraft so that launcher 2 can be suspended from the wings or fuselage of the aircraft. Launcher body 4 is preferably formed from a durable material such as aluminum so that rocket launcher 2 can be used for numerous missions without requiring detachment from the aircraft. The foregoing rocket launcher construction is more specifically set forth in U.S. Patent 3,315,565.

Figure 2:
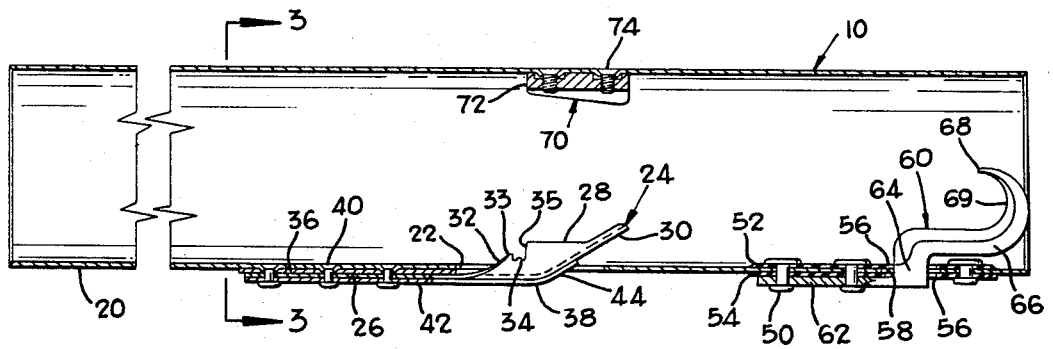
FIG. 2 is a longitudinal sectional view of the launcher tube.
Figure 3:
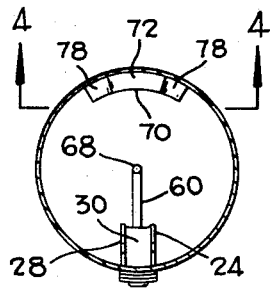
FIG. 3 is a sectional view taken along line 3—3 of FIG. 2.
Figure 4:
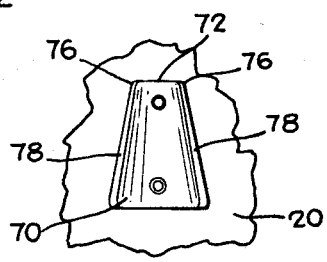
FIG. 4 is a sectional view taken along line 4—4 of FIG. 3.
Figure 5:
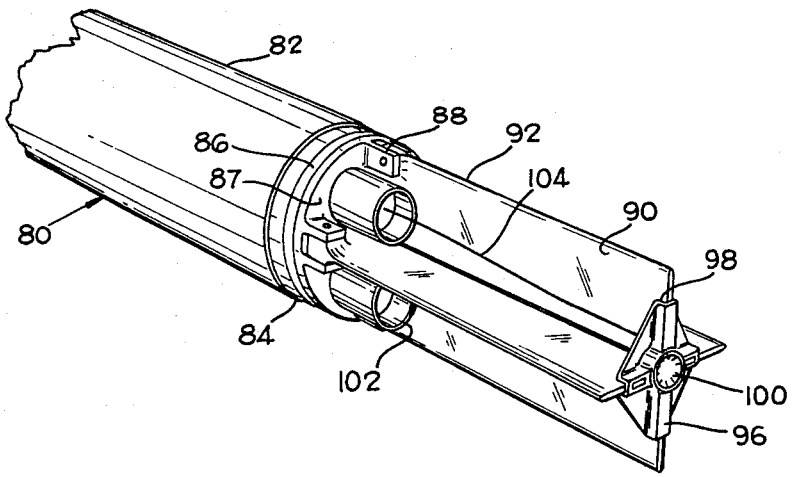
FIG. 5 is a fragmentary sectional view of a rocket adapted for insertion in the launcher tubes of the present invention.
Figure 6:
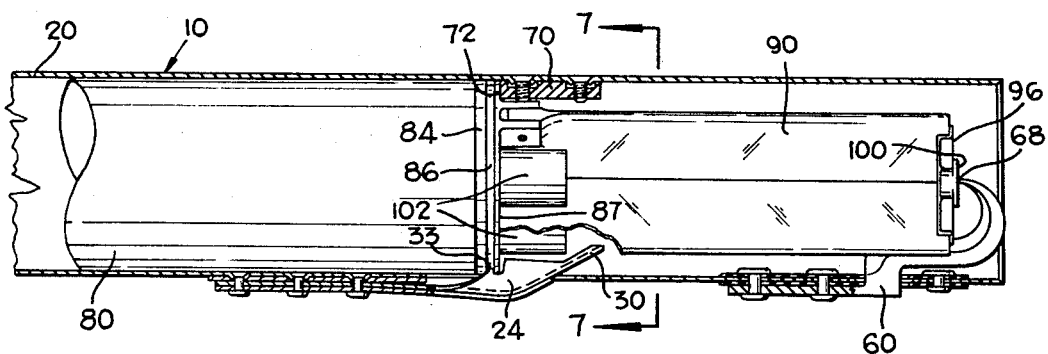
FIG. 6 is a fragmentary longitudinal sectional view of the launcher tube with the rocket of FIG. 5 inserted therein.

As will be seen by reference to FIGS. 2 and 3, each rocket tube 10 comprises a barrel 20 preferably formed from aluminum and having an elongated cut-out 22 located near its rear end. Attached firmly to barrel 20 is a spring detent 24 preferably formed from a resilient stainless steel and integrally including a forwardly projecting mounting plate 26 which extends along the outer surface of barrel 20 forwardly from cut-out 22. Mounting plate 26 rearwardly merges into a pair of inwardly projecting side flanges 28 which are separated by a bight-forming deflecting blade 30. Both flanges 28 and blade 30 project through cut-out 22 into the interior of barrel 20 where flanges 28 are provided with rearwardly inclined camming edges 32 which lead up to and form the forward edges of latching tabs 33. To the rear of tabs 33, flanges 28 are relieved in the provision of inwardly opening detent notches 34 which, in turn, rearwardly terminate at generally radial abutment edges 35. Deflecting blade 30 is also inclined rearwardly within the interior of barrel 20 and terminates a substantial distance beyond the inwardly presented surface thereof. Mounting plate 26 is sandwiched between a shim 36 and a leaf-type reinforcing spring 38, and all three of the foregoing are held securely to barrel 20 by means of rivets 40. Reinforcing spring 38 also includes an elongated mounting plate 42 which rearwardly merges into an inwardly turned end portion 44, which, in turn, bears against the rearwardly presented surface of blade 30. By reason of the foregoing construction, spring detent 24 is free for a limited degree of flexure, thereby allowing flanges 28 and blade 30 to move slightly outwardly.

Affixed to the inner and outer surfaces of barrel 20 directly to the rear of spring detent 24 by means of rivets 50 are elongated axially extending dielectric plates 52, 54, having registered rectangular apertures 56 which align with but are slightly smaller than an aperture 58 formed in barrel 20. Consequently dielectric plates 52, 54, extend inwardly beyond the margin of aperture 58 and prevent unauthorized electrical contact with barrel 20 at this point. Also secured to barrel 20 is a tail contact 60 formed from a strong somewhat resilient material having good electrical conductivity, such as bronze, and having an integral rectangular mounting plate 62 which is secured against the outwardly presented face of dielectric plate 54 by rivets 50. At its rear end, plate 62 merges into a radially inwardly extending neck 64 which projects through apertures 56, 58, and into the interior of barrel 20. Within barrel 20 neck 64 merges into a rearwardly extending hook portion 66 which curves inwardly and then forwardly and eventually terminates at a contact point 68 located coincident to the axial centerline of tube 10. Along their leading margins hook portion 66 and neck 64 are beveled in the provision of a continuous knife edge 69. By reason of the foregoing construction, hook portion 66 is capable of limited flexure and, consequently, the axial position of contact point 68 within barrel 20 is dependent on the degree to which hook 66 is flexed. Furthermore, tail contact 60 is electrically isolated from the remaining portion of barrel 20 as well as from rocket launcher body 4 and is connected through an intervalometer or other firing device (not shown) to the power supply of the aircraft. Consequently, it is possible to maintain tail contact 60 at a potential different from that of the remaining portions of launcher body 4, including tube 10 and spring detent 24.

Affixed to barrel 20 against the external surface thereof and directly opposite spring detent 24 is a plate-like rocket stop member 70 having a forwardly presented abutment face 72 located approximately one-sixteenth of an inch to the rear of abutment edges 35 on spring detent 24. Stop member 70 is curved to conform to the curvature of barrel 20 and is, furthermore, secured thereto by means of a plurality of machine screws 74. Abutment face 72 merges at its ends into arcuate corners 76 which, in turn, merge into a pair of rearwardly diverging side or camming faces 78.

Rocket tubes 10 are adapted to accept conventional air-to-ground or air-to-air rockets 80, and, broadly speaking, each of these rockets comprises a propellant-filled cylindrical shell 82 which forwardly terminates at a somewhat conical warhead 83. At its rear end, shell 82 is fitted with a latching rim 84 having an outwardly opening peripheral groove 86 and a substantially flat rear face 87 from which four bifurcated rearwardly projecting brackets 88 project at 90° intervals. Pinned intermediate the furcations of each bracket 88 is a spring-loaded stabilizing fin 90 having a beveled leading edge 92. Fins 90 swing from a restrained retracted position wherein their leading edges 92 are located flush with and form a rearward extension of shell 82 to an unrestrained extended position wherein they project outwardly beyond shell 82 with leading edges 92 presented forwardly. At their extreme outer or rear ends fins 90 are provided with inwardly extending notches and fitted against those ends is a fin retainer plate 96 having lips 98 which project forwardly into the notches and thereby retain fins 90 in their retracted position. Retainer plate 96 is formed from a suitable dielectric material and is centrally provided with a rearwardly facing electrical contact button 100. Intermediate bifurcated brackets 88, rim 84 is fitted with four rearwardly directed discharge nozzles 102 and exetnding through one of nozzles 102 to contact button 100 is an ignition wire 104.

Rocket launcher 2 is loaded by inserting a rocket 80 into the forward end of each tube 10 and urging it rearwardly through barrel 20 thereof. It should be noted that ordnance manufacturers supply rockets 80 with retainer plates 96 in retentive engagement with fins 90 so that fins 90 are in their retracted position. Consequently, fins 90 need not be manipulated prior to insertion into tubes 10. Upon being inserted in a tube 10, fins 90 will eventually come to the vicinity of spring detent 24 and stop member 70 at which point either one of fins 90 will abut against abutment face 72 and thereby prevent further rearward movement or else a pair of fins 90 will straddle stop member 70 and allow rocket 80 to be inserted still further. In the former case, rocket 80 should be withdrawn slightly to free the opposite fin 90 from spring detent 24 and then it should be rotated approximately one-eighth of a turn so that when it is again inserted a pair of fins 90 will straddle stop member 70. The foregoing problem can be eliminated by merely providing suitable indicia adjacent the forward end of tube 10 to advise ordnance personnel of the location of spring detent 24 and tail contact 60 within barrel 20.

Figure 7:
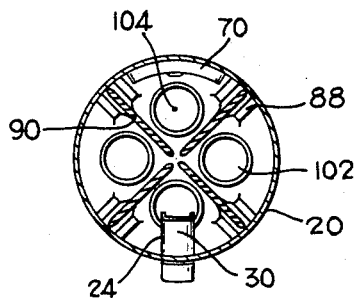
FIG. 7 is a sectional view taken along line 7—7 of FIG. 6.

Assuming now that a pair of fins 90 is aligned so as to straddle abutment face 72, but not necessarily stop member 70 in its entirety, then as rocket 80 moves rearwardly one of the pair of fins 90 will engage one of the rearwardly diverging side faces 78 and consequently rocket 80 will be cammed into the correct angular position within barrel 20 as it is pushed rearwardly. It should be noted that stop member 70 at its rear end spans a substantial distance between the straddling pair of fins 90 so that angular rotation of rocket 80 within tube 10 is severely limited when rocket 80 is fully inserted. As a result, it is possible to bring nozzles 102 of every rocket 80 inserted into a particular tube 10 into substantially the same position, and in this position one of nozzles 102 will be located directly in front of blade 30 of spring detent 24 (FIG. 7).

As rocket 80 moves rearwardly, latching rim 84 will eventually engage camming edges 32 on flanges 28 of spring detent 24 and will cause flanges 28 and deflecting blade 30 to move slightly outwardly. Finally, rim 84 will ride up over tab 33 and the latter will snap into peripheral groove 86, thereby providing positive retention of rocket 80 in tube 10. In this position, the rear face 87 of rim 84 will abut against generally radial abutment edges 35 on flanges 28. Furthermore, the distance between tabs 33 and contact point 68 of tail contact 60 is slightly less than the distance between groove 86 and contact button 100 so that tail contact 60 will be deflected slightly to establish good electrical contact between contact button 100 and point 68.

If for some reason rocket 80 is thrust with excessive force into tube 10, rear face 87 of rim 84 will abut against abutment face 72 of stop member 70 immediately after tabs 33 snap into peripheral groove 86. This will immediately halt further rearward movement of rocket 80 so as to prevent permanent distortion of spring detent 24 and tail contact 60. If stop member 70 were not present, it is quite possible that tail contact 60 would be bent rearwardly and accordingly electrical contact between point 68 and contact button 100 would not be established. This would result in a misfire when an electrical impulse was sent to tail contact 60. Similarly, spring detent 24 could be permanently bent rearwardly so that tabs 33 would not engage rim 84 and this would result in poor or no contact with contact point 68 or, much worse, a rocket being dislodged when the aircraft is subjected to a severe deceleration such as when landing upon the flight deck of an aircraft carrier. In any event stop member 70 provides an abutment which precludes rearward movement of rocket 80 beyond a point which would distort or otherwise damage spring detent 24 or tail contact 60 or both.

Once retentively engaged by spring detent 24, rocket 80 can be ignited by placing tail contact 60 at a predetermined potential different from that of launcher body 4. This will cause an electrical current to flow through rocket 80 by way of spring detent 24, rim 84, ignition wire 104, contact button 100 and tail contact 60. The current will also pass through the igniter of rocket 80 and thereby ignite the propellant charge. When this occurs, a blast of propellant issues fom discharge nozzles 102 and inasmuch as one of discharge nozzles 102 is located immediately forwardly of blade 30, the blast issuing therefrom will force blade 30 downwardly against the bias of mounting plate 26 and reinforcing spring 38. As blade 30 moves downwardly so will tab 33. Consequently, tab 33 will move out of peripheral groove 86 and free rocket 80 for forward movement. As rocket 80 advances in barrel 20, the blast issuing from nozzles 102 will impinge against the forward face of fin retainer plate 96 and dislodge it from fins 90. Once rocket 80 exits from tube 10 fins 90 will spring outwardly and stabilize rocket 80 in flight. Finally, knife edge 69 on tail contact 60 will deflect the blast issuing from nozzles 102 so that tail contact 60 is not damaged thereby.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rocket launcher tube for carrying and launching a rocket having rearwardly opening nozzles and stabilizing fins which extend rearwardly and form the trailing end of the rocket when the rocket is carried in the launcher tube; said launcher tube comprising a barrel sized to receive the rocket, a stop member projecting into the barrel beyond the outermost edges of the fins and having a forwardly presented abutment face for engaging the rocket forwardly of the rearmost ends of the fins so as to prevent rearward displacement of the rocket beyond a predetermined point, the stop member being of a configuration which prevents substantial rotation of the rocket in the barrel whereby the nozzles will assume a predetermined position in the barrel, retaining means shiftably mounted on the barrel for movement from an engaged position wherein it retentively engages the rocket to a release position wherein it relaxes its engagement with the rocket, and deflecting means projecting into the barrel adjacent and to the rear of one of the nozzles when the rocket is in the predetermined position and being connected to the retaining means for moving the retaining means from its engaged to its release position when deflected, the deflecting means being oriented such that the blast issuing from an ignited rocket will deflect it and thereby move the retaining means to its release position so as to free the rocket for forward flight.

2. A launcher tube according to claim 1 wherein the stop member fits between two adjacent fins on the rocket.

3. A launcher tube according to claim 2 wherein the stop member is provided with camming faces which engage the fins and cam the rocket into the predetermined position as the rocket is inserted rearwardly in the barrel.

4. A launcher tube according to claim 3 in which the camming faces rearwardly diverge from the abutment face.

5. A launcher tube according to claim 4 for carrying rockets provided adjacent their rear ends with peripheral grooves; wherein the retaining means is a spring detent mounted on the barrel for limited flexing movement and including an inwardly projecting tab which aligns with and projects into the peripheral groove on the rocket when the end face of the rocket is adjacent the abutment face of the stop member.

6. A launcher tube according to claim 5 in which the stop member is a plate contoured to conform to the inwardly presented surface of the barrel.

7. A launcher tube according to claim 5 wherein the deflecting means is a blade connected to the spring detent and projecting into the interior of the barrel to the rear of one of the nozzles, whereby when the rocket ignites the blast issuing from the nozzle will impinge against the deflecting blade and flex the spring detent outward so as to withdraw its tab from the peripheral groove and free the rocket for forward flight.

8. A launcher according to claim 7 and further characterized by a tail contact mounted on the barrel to the rear of the spring detent for limited flexing movement, the tail contact being adapted to engage and establish electrical contact with an electrical contactor element on the rocket.

9. A launcher tube according to claim 2 wherein the stop member is mounted rigid with respect to the barrel.

10. A launcher tube according to claim 2 wherein the abutment face extends substantially circumferentially in the barrel and the stop member is provided with a pair of side-facing camming faces which diverge rearwardly from the abutment face for engaging the fins and camming the rocket into the predetermined position as the rocket is advanced rearwardly in the barrel.

References Cited

UNITED STATES PATENTS

| | | | |
|---|---|---|---|
| 2,448,962 | 9/1948 | D'Ardenne | 89—1.807 |
| 2,481,910 | 9/1949 | D'Ardenne | 89—1.807 |
| 2,742,820 | 4/1956 | Brown et al. | 89—1.807 |
| 2,844,073 | 7/1958 | Re et al. | 89—1.807 |
| 2,848,925 | 8/1958 | Hood | 89—1.806 |
| 2,931,273 | 4/1960 | Weatherhead | 89—1.817 |
| 3,315,565 | 4/1967 | Nash | 89—1.816 |

SAMUEL W. ENGLE, *Primary Examiner.*